United States Patent
Czajkowski

[15] 3,678,669
[45] July 25, 1972

[54] SWEEPER ATTACHMENT FOR HARVESTING MACHINERY

[72] Inventor: Henry J. Czajkowski, 301 24th Ave., Yuma, Ariz. 85364

[22] Filed: Sept. 28, 1970

[21] Appl. No.: 75,942

[52] U.S. Cl. .................................56/314, 56/364
[51] Int. Cl. ....................................A01d 43/02
[58] Field of Search ............................56/314, 364

[56] References Cited

UNITED STATES PATENTS 2,783,606   3/1957   Wilson.....................................56/314
3,125,845   3/1964   Lee..........................................56/364

*Primary Examiner*—Antonio F. Guida
*Attorney*—Warren F. B. Lindsley

[57] ABSTRACT

A sweeper wheel having resilient fingers positioned on its periphery which is adjustably mounted on the free end of a support arm extending laterally out from the front end of a harvesting machine wherein said sweeper wheel axle is mounted in a plate which provides for predetermined arcuate adjustment of the sweeper wheel relative to its support arm.

1 Claim, 6 Drawing Figures

Patented July 25, 1972

3,678,669

INVENTOR.
HENRY J. CZAJKOWSKI
BY Warren F. B. Lindley

ATTORNEY

Patented July 25, 1972

INVENTOR.
HENRY J. CZAJKOWSKI
BY
ATTORNEY

SWEEPER ATTACHMENT FOR HARVESTING MACHINERY

BACKGROUND OF THE INVENTION

This invention relates to agricultural machinery and more particularly to sweeper attachments for harvesting type equipment.

1. FIELD OF THE INVENTION

With the advent of mechanical harvesters, plant growth that is lying on the ground surface just outside of the pick up path of the harvester was lost or had to be collected by hand. This is particularly true when the plant growth was cut off of a mound or slope where the harvester could not pass over to claim the harvest. Additionally, row and randomly grown plants when cut at times are wind driven out of their growing areas so as to hinder the machine harvesting of the plants.

2. DESCRIPTION OF THE PRIOR ART

At the present time sweeper attachments for cotton picking machines have been provided. These attachments have been adapted for salvaging loose cotton from the ground and depositing the cotton back on to the stalk so that the cotton can be repicked with the conventional cotton picking machine. Sweeper attachments have also been used to sweep plant stalks in front of a harvesting machine but difficulty has been experienced in adjustably positioning the sweeper so that it can easily negotiate mounds of dirt, rocks and other like type of barriers which might damage the sweeper attachment or at least keep it from picking up the cut plants.

SUMMARY OF THE INVENTION

In accordance with the invention claimed a new and improved accumulating device in the form of a sweeper is provided which because of a novel bracket attachment and sweeper wheel arm assembly can easily negotiate rough terrain.

It is, therefore, one object of this invention to provide a new and improved accumulating device for harvesting plant stalks.

Another object of this invention is to provide an improved sweeper arm for a harvesting device.

A further object of this invention is to provide an improved sweeper arm bracket assembly for attachment to a harvester for accumulating plant growth outside of the path of travel of the harvester.

A still further object of this invention is to provide an improved attachment means for a sweeper arm for a harvesting machine such as a baler which permits the accumulator on the sweeper arm means to be moved to one position when inactive and to another position for harvesting purposes.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which.

DESCRIPTION OF PREFERRED EMBODIMENT

Figure 1:
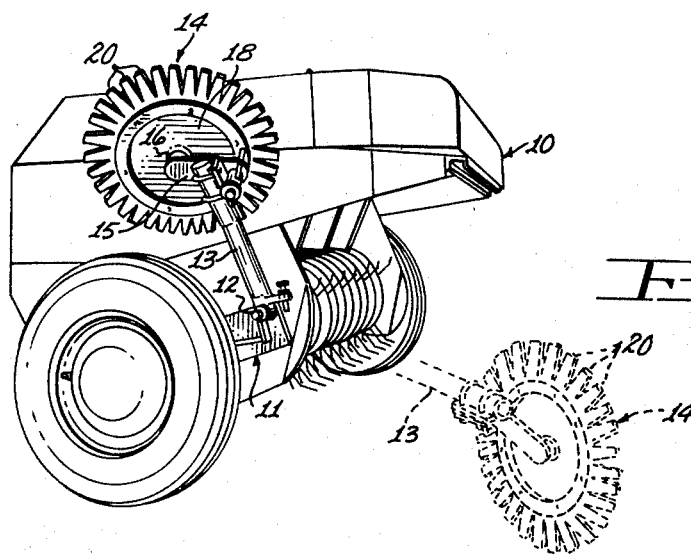
FIG. 1 is a side elevation of a harvester employing a sweeper arm and attachment means and embodying the invention.

Referring more particularly to the drawing by characters of reference FIG. 1 discloses a baler 10 for accumulating and baling plant growth previously cut where grown or raked into rows or stacks. The baler travels along rows or paths in the usual manner.

Figure 2:
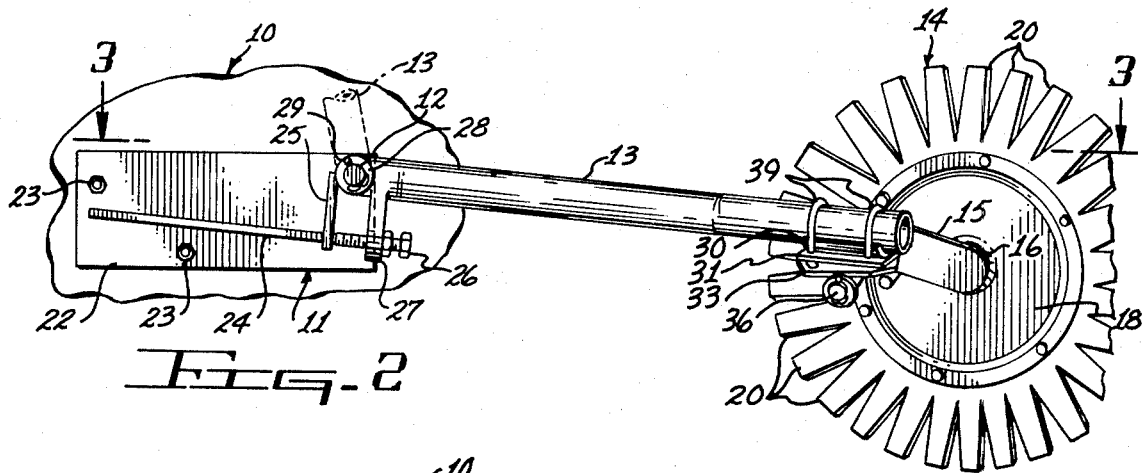
FIG. 2 is an enlarged view of the sweeper arm and attachment means illustrated in FIG. 1.
Figure 3:
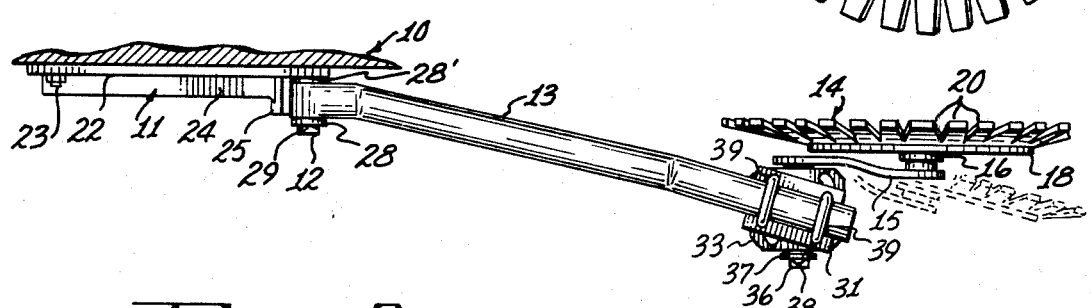
FIG. 3 is a cross sectional view of FIG. 2 taken along the line 3—3.

Fixed to the front portion of the baler is a bracket 11 to one end of which is attached a pivot pin 12 upon which the outwardly divergently extending support arm 13 is pivotally mounted. A sweeper wheel 14 is provided on arm 13 as shown in FIGS. 1-3 by a suitable axle plate 15 to the outer end of which is journaled the wheel 14 by a suitable bearing 16. Sweeper wheel 14 comprises a disc 18 journaled on bearing 16 and about the periphery of which is mounted a series of radially disposed circular comb or flexible sweeper fingers 20. The axis of rotation of the disc 18 is angularly disposed relative to the direction of travel of the baler 10 along its predetermined path.

The sweeper wheel is normally positioned to roll on the ground or stubble with the flexible sweeper fingers 20 bending backwardly under the forward movement of the baler, flicking forwardly as the wheel turns inwardly and upwardly so as to progressively sweep the cut plant growth from outside of the path of movement of the baler toward and into the path of movement of the baler.

The sweeper wheel 14 is angularly positioned and journaled on the axle plate 15 so as to ride over most of the mounds, rocks, hilly surfaces, etc., without missing any plant growth lying on the ground. The sweeper wheel is rotated by passing over the ground or stubble with the forward motion of the baler machine and is angularly positioned so as to cause a side thrust to the center of the path of movement of the baler moving with it any loose plant growth on the ground surface.

In order to effectively position the sweeper wheel in the right position as well as to mount it so it can negotiate any terrain the wheel attachment assembly comprises two attachment means at each end of the support arm 13.

Bracket 11 attaching support arm 13 to the baler comprises a plate 22 bolted to the frame of the baler by a plurality of bolts 23. An L-shaped brace 24 forms a support and restriction means for support arm 13 in its normal working position and in its inactive traveling position shown in full lines in FIG. 1 and partially in dot dash lines in FIG. 2.

As shown in FIGS. 1 and 2 when the support arm 13 and wheel 14 are moved to their inactive travel position stop 25 of L-shaped brace 24 restricts and stops the support arm from further counterclockwise rotation. Clockwise rotation is controlled by a threaded bolt 26 extending through a lateral extension 27 of support arm 13 and abutting against stop 25 of L-shaped brace 24.

Figure 4:
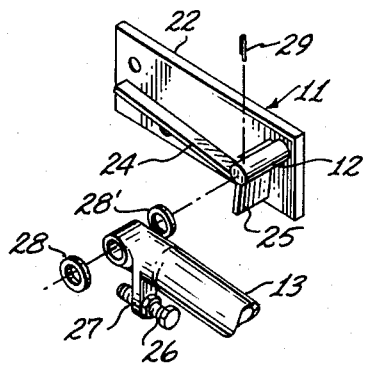
FIG. 4 is an enlarged exploded view of the bracket and attachment means for attaching the sweeper arm to the harvester.

FIGS. 3 and 4 illustrate the way arm 13 is pivotally mounted on pin 12 and held thereon by a pair of spacer rings or washers 28, 28' and a cotter pin 29.

Figure 5:
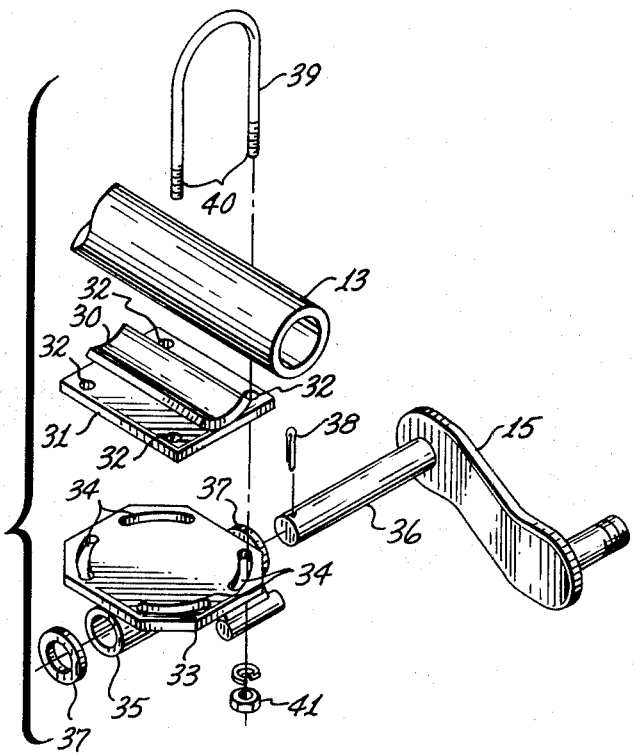
FIG. 5 is an enlarged exploded view of the mounting means for attaching the sweeper wheel to the attachment arm.

FIGS. 3 and 5 illustrate the means for pivotally mounting the support arm 13. As noted in FIG. 5 the end of support arm 13 rests in an arcuate cradle 30 which is attached to plate 31. Plate 31 has an aperture 32 in each corner. Plate 31 is arranged to sit on a support plate 33 which is provided with arcuate slots 34 spacedly arranged around a given radius. Plate 33 is provided with a hollow cylindrical bearing surface 35 for receiving a bearing pin 36 fixedly attached to axle plate 15. Bearing pin 36 is held in the hollow cylindrical bearing surface 35 by a spacer or washer 37 and a cotter pin 38.

When a pair of U bolts 39 having threaded ends 40 are inserted over the end of support arm 13 passing through apertures 32 and slots 34, they attach support arm 13 in a given position relative to axle plate 15 when nuts 41 are threaded on to their threaded ends 40. Thus, the relative position of sweeper wheel 14 may be angularly positioned with reference to arm 13 as shown in dot dash position in FIG. 3.

Figure 6:
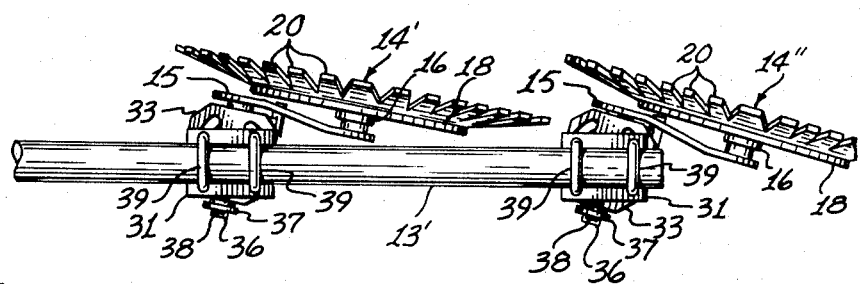
FIG. 6 is a modification of the structure shown in FIGS. 1-5 wherein two sweeper wheels are attached to a single attachment arm.

FIG. 6 illustrates a pair of sweeper wheels 14', 14" mounted on support arm 13' by the same means shown and described above for holding sweeper wheel 14 on support arm 13. Each sweeper wheel 14', 14" may be individually angularly positioned so as to sweep the plant growth individually into the path of movement of baler 10 or sequentially from support wheel 14" to support wheel 14' and then in front of baler 10.

While the apparatus disclosed constitutes a preferred form of the invention, it is also to be understood that the apparatus is capable of mechanical alternations without departing from the spirit of the invention and that such mechanical arrangements and commercial adaptations as fall within the scope of the appended claims are intended to be included herein.

What is claimed is:

1. A sweeper attachment for the frame of a harvesting machine comprising in combination:
   a support arm,
   a bracket for pivotally supporting said support arm on the harvesting machine,
   a pair of axle plates spacedly mounted on the free end of said support arm for arcuate movement relative to said support arm in a horizontal plane substantially parallel to a longitudinal cross section of said support arm,
   means for locking said support arm and said axle plates in given relative positions,
   a pair of sweeper wheels, one journaled on each axle plate and disposed to freely revolve about its axis sloping upwardly and forwardly relative to the direction of travel of the attachment along a given path of movement of the harvesting machine, and
   radially disposed resilient sweeper fingers formed on the periphery of each sweeper wheel, said fingers positioned to roll with their outer ends substantially in contact with the ground surface so as to pick up plant growth from the ground surface and raise it rearwardly, upwardly and laterally of the axis of said support arm.

* * * * *